United States Patent
Arjakine et al.

(10) Patent No.: US 7,915,566 B2
(45) Date of Patent: Mar. 29, 2011

(54) WELD FILLER, USE OF THE WELD FILLER AND WELDING PROCESS

(75) Inventors: Nikolai Arjakine, Berlin (DE); Rolf Wilkenhöner, Kleinmachnow (DE)

(73) Assignee: Siemens Aktiengesellschaft, Munich (DE)

( * ) Notice: Subject to any disclaimer, the term of this patent is extended or adjusted under 35 U.S.C. 154(b) by 1169 days.

(21) Appl. No.: 11/584,879

(22) Filed: Oct. 23, 2006

(65) Prior Publication Data

US 2007/0090167 A1 Apr. 26, 2007

(30) Foreign Application Priority Data

Oct. 24, 2005 (EP) .................................. 05023192

(51) Int. Cl.
*B23K 9/23* (2006.01)
*B23K 35/30* (2006.01)
*B23K 35/36* (2006.01)

(52) U.S. Cl. ............ 219/137 WM; 219/136; 219/137 R

(58) Field of Classification Search .......... 219/137 WM, 219/136, 137 R; 420/448, 449; 148/675, 148/677

See application file for complete search history.

(56) References Cited

U.S. PATENT DOCUMENTS

| | | | | |
|---|---|---|---|---|
| 3,741,824 A * | 6/1973 | Duvall et al. | ................ | 148/527 |
| 4,219,592 A * | 8/1980 | Anderson et al. | ............. | 427/405 |
| 4,359,352 A * | 11/1982 | Ray et al. | .................. | 75/246 |
| 6,024,792 A | 2/2000 | Kurz et al. | | |
| 6,702,906 B2 * | 3/2004 | Ogawa et al. | ................ | 148/428 |
| 6,797,232 B2 * | 9/2004 | Speidel et al. | ............... | 420/445 |
| 2004/0115086 A1 | 6/2004 | Chabenat et al. | | |
| 2006/0051234 A1 * | 3/2006 | Pike | ............................. | 420/448 |
| 2006/0144477 A1 * | 7/2006 | Cox et al. | ..................... | 148/522 |

FOREIGN PATENT DOCUMENTS

| | | |
|---|---|---|
| EP | 0 412 397 A1 | 2/1991 |
| EP | 0 486 489 B1 | 5/1992 |
| EP | 0 786 017 B1 | 7/1997 |
| EP | 0 892 090 A1 | 1/1999 |
| EP | 1 204 776 B1 | 5/2002 |
| EP | 1 306 454 A1 | 5/2003 |
| EP | 1 319 729 A1 | 6/2003 |
| EP | 1 428 897 A1 | 6/2004 |
| WO | WO 99/67435 A1 | 12/1999 |
| WO | WO 00/44949 A1 | 8/2000 |

OTHER PUBLICATIONS

K. Banerjee, N.L. Richards, M.C. Chaturvedi; "Effect of Filler Alloys on Heat-Affected Zone Cracking in Preweld Heat-Treated IN-738 LC Gas-Tungsten-Arc Welds", Metallurgical and Materials Transactions A; Jul. 2005; pp. 1881-1890, vol. 36A; XP009059582.

E.F. Bradley; "Superalloys A Technical Guide"; ASM International; 1988; Chapter 13; pp. 197-199, 201, 207, 212-214, 13; XP002361607; Metals Park, Ohio, US.

Ramazan Kayacan, Remzi Varol, Olcay Kimilli; "The effects of pre- and post-weld heat treatment variables on the strain-age cracking in welded Rene 41 components"; Materials Research Bulletin 39 . . . 11, 2004, pp. 2171-2186, XP004607869; Pergamon Press, New York, US.

* cited by examiner

*Primary Examiner* — M. Alexandra Elve

(57) ABSTRACT

The invention relates to a weld filler and to a use of a weld filler which significantly improves the weldability of some nickel-based superalloys and includes the following constituents (in wt %): 17.5%-20.0% chromium (Cr) 10.0%-12.0% cobalt (Co) 9.0%-10.5% molybdenum (Mo) 0.1%-3.3% titanium, in particular 3.0%-3.3% titanium (Ti), 1.4%-1.8% aluminum (Al), 0.04%-0.12% carbon, 0.003%-0.01% boron (B), remainder nickel.

2 Claims, 4 Drawing Sheets

FIG 1

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Remainder | 19.0 | | 2.0 | 1.0 | | 1.2 | 2.3 | 0.008 | | |
| IN 939 | 0.15 | 22.4 | Remainder | 19.0 | | 2.0 | 1.4 | 1.0 | 1.9 | 3.7 | 0.009 | 0.10 | |
| IN 6203 DS | 0.15 | 22.0 | Remainder | 19.0 | | 2.0 | 1.1 | 0.8 | 2.3 | 3.5 | 0.010 | 0.10 | 0.75 |
| Udimet 500 | 0.10 | 18.0 | Remainder | 18.5 | 4.0 | | | | 2.9 | 2.9 | 0.006 | 0.05 | |
| IN 738 LC | 0.10 | 16.0 | Remainder | 8.5 | 1.7 | 2.6 | 1.7 | 0.9 | 3.4 | 3.4 | 0.010 | 0.10 | |
| SC 16 | <0.01 | 16.0 | Remainder | | 3.0 | | 3.5 | | 3.5 | 3.5 | <0.005 | <0.008 | |
| Rene 80 | 0.17 | 14.0 | Remainder | 9.5 | 4.0 | 4.0 | | | 3.0 | 5.0 | 0.015 | 0.03 | |
| GTD 111 | 0.10 | 14.0 | Remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Remainder | 9.0 | 1.9 | 4.1 | 4.1 | | 3.4 | 3.8 | 0.015 | 0.02 | |
| IN 792 DS | 0.08 | 12.5 | Remainder | 9.0 | 1.9 | 4.1 | 4.1 | | 3.4 | 3.8 | 0.015 | 0.02 | 1.00 |
| MAR M 002 | 0.15 | 9.0 | Remainder | 10.0 | | 10.0 | 2.5 | | 5.5 | 1.5 | 0.015 | 0.05 | 1.50 |
| MAR M 247 LC DS | 0.07 | 8.1 | Remainder | 9.2 | 0.5 | 9.5 | 3.2 | | 5.6 | 0.7 | 0.015 | 0.02 | 1.40 |
| CMSX-2 | <.006 | 8.0 | Remainder | 4.6 | 0.6 | 8.0 | 6.0 | | 5.6 | 1.0 | <.003 | <.0075 | 0.10 |
| CMSX-3 | <.006 | 8.0 | Remainder | 4.6 | 0.6 | 8.0 | 6.0 | | 5.6 | 1.0 | <.003 | <.0075 | 0.10 |
| CMSX-4 | | 6.0 | Remainder | 10.0 | 0.6 | 6.0 | 6.0 | | 5.6 | 1.0 | | Re=3.0 | |
| CMSX-6 | <.015 | 10.0 | Remainder | 5.0 | 3.0 | <.10 | 2.0 | <.10 | 4.9 | 4.8 | <.003 | <.0075 | 0.10 |
| PWA 1480 SX | <.006 | 10.0 | Remainder | 5.0 | | 4.0 | 12.0 | | 5.0 | 1.5 | <.0075 | <.0075 | 0.10 |
| PWA 1483 SX | 0.07 | 12.2 | Remainder | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Remainder | | 7.5 | | | | | 0.010 | | |
| X 45 | 0.25 | 25.0 | 10 | Remainder | | 8.0 | | | | | 0.010 | | |
| ECY 768 | 0.65 | 24.0 | 10 | 51.7 | | 7.5 | 4.0 | | | 0.3 | 0.010 | 0.05 | |
| MAR-M-509 | 0.65 | 24.5 | 11 | Remainder | | 7.5 | 4 | | 0.25 | 0.3 | 0.010 | 0.60 | |
| CM 247 | 0.07 | 8.3 | Remainder | 10.0 | 0.5 | 9.5 | 3.2 | | 5.5 | 0.7 | | | 1.5 |

Chemical composition in %

WELD FILLER, USE OF THE WELD FILLER AND WELDING PROCESS

CROSS REFERENCE TO RELATED APPLICATIONS

This application claims the benefits of European Patent application No. 05023192.7 filed Oct. 24, 2005. All of the applications are incorporated by reference herein in their entirety.

FIELD OF INVENTION

The invention relates to a weld filler, to the use thereof and to a welding process as claimed in the claims.

BACKGROUND OF THE INVENTION

Of all high-temperature materials, nickel-based superalloys have the most favorable combination of mechanical properties, resistance to corrosion and processability for gas turbine construction for aircraft and power plants. The considerable increase in strength is made possible in particular by the particle hardening with very high proportions by volume of the coherent $\gamma'$ phase $Ni_3(Al\text{—}Ti, Ta, Nb)$. However, in general alloys with a higher $\gamma'$ content can only be considered weldable to a limited extent. This poor weldability is caused by:
  a) Nickel alloys generally have a relatively low thermal conductivity and a relatively high coefficient of thermal expansion, similar to the values of austenitic steels and Co alloys. The welding heat which is introduced is therefore dissipated comparatively slowly, and the inhomogeneous heating leads to high thermal stresses, causing thermal fatigue which can only be dealt with at considerable effort.
  b) Nickel alloys are very sensitive to hot cracks in the event of a rapid change in the temperature cycles within the high temperature range. The cause is grain boundary fusion resulting from fluctuations in the chemical composition (segregations) or the formation of low-melting phases, such as sulfides or borides.
  c) Nickel alloys generally have a high proportion of the $\gamma'$ phase in a $\gamma$ matrix. In the case of nickel-based superalloys for turbine components, the $\gamma'$ phase amounts to greater than 40 vol %. This achieves a high strength but also leads to a low ductility of the material, in particular at low temperatures and in the range of the temperature field in which the $\gamma/\gamma'$ precipitation phenomenon may occur ("ductility-dip temperature range", also known as the "subsolidus ductility dip", approximately 700° C. to 1100° C., depending on the alloy). Consequently, stresses which occur can less readily be absorbed through plastic flow, which generally increases the risk of crack formation.
  d) Nickel alloys exhibit the phenomenon of post-weld heat treatment cracks, also known as strain-age cracking. In this case, cracks are produced in a characteristic way in the first heat treatment following the weld as a result of $\gamma/\gamma'$ precipitation phenomena in the heat-affected zone or—if the weld filler can form the $\gamma'$ phase—also in the weld metal. This is caused by local stresses which form during the precipitation of the $\gamma'$ phase as a result of the contraction of the surrounding matrix. The susceptibility to strain-age cracking increases with an increasing level of $\gamma'$-forming alloy constituents, such as Al and Ti, since this also increases the proportion of $\gamma'$ phase in the microstructure.

If welds in which the base metal and the filler are identical are attempted at room temperature using conventional welding processes, for many industrial Ni-based superalloys for turbine laser vanes (e.g. IN738LC, Rene80, IN939), it is not currently possible to avoid the formation of cracks in the heat-affected zone and in the weld metal.

At present, a number of processes and process steps are known to improve the weldability of nickel-based superalloys:

a) Welding with preheating:

One way of avoiding cracks when welding nickel-based superalloys using high-strength fillers (likewise nickel-based superalloys) is to reduce the temperature difference and therefore the stress gradient between weld joint and the remainder of the component. This is achieved by preheating the component during the welding. One example is manual TIG welding in a shield and gas box, with the weld joint being preheated inductively (by means of induction coils) to temperatures of greater than 900° C. However, this makes the welding process significantly more complicated and expensive. Moreover, on account of inaccessibility, this cannot be implemented for all regions which are to be welded.

b) Welding with extremely little introduction of heat:

This involves the use of welding processes which ensure that very little heat is introduced into the base metal. These processes include laser welding and electron beam welding. Both processes are very expensive. Moreover, they require outlay on programming and automation, which may be uneconomical for repair welds, with frequently fluctuating damage patterns and locations.

US 2004/0115086 A1 has disclosed a nickel alloy with various additions.

SUMMARY OF INVENTION

Therefore, it is an object of the invention to provide a weld filler, a use of the weld filler and a welding process which overcome the problems of the prior art.

The object is achieved by the weld filler, by the use of the weld filler and by the welding process as claimed in the claims.

The subclaims give advantageous configurations which can advantageously be combined with one another as desired.

The invention proposes a weld filler and a use thereof which allows the repair welding of gas turbine blades or vanes and other hot-gas components made from nickel-based superalloys by manual or automated welding at room temperature. The weld filler is likewise a $\gamma'$-hardened nickel-based superalloy, but differs in particular from the material of a substrate of a component that is to be prepared. The welding repair allows a low cycle fatigue (LCF) corresponding to approximately 50% or more of the properties of the base metal (the weld withstands 50% of the LCF cycles of the base metal).

BRIEF DESCRIPTION OF THE DRAWINGS

The invention is explained in more detail below. In the drawing:

FIG. 1 shows a list of the composition of materials which can be welded using the filler according to the invention.

DETAILED DESCRIPTION OF INVENTION

Figure 2:
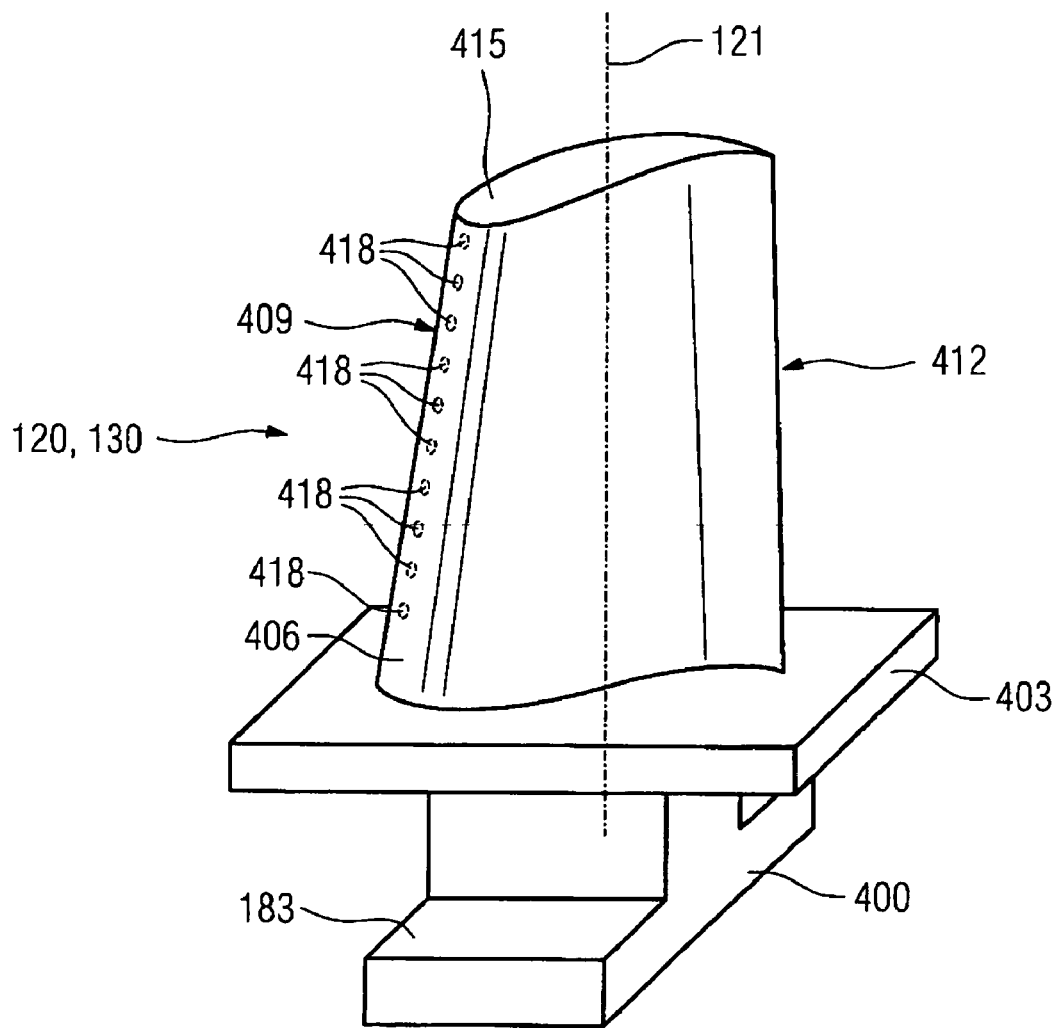
FIG. 2 shows a perspective view of a turbine blade or vane.

The invention proposes a welding process for welding components such as hot-gas components 138, 155 (FIG. 3, 4) and turbine blades or vanes 120, 130 (FIG. 2) made from nickel-based superalloys, which preferably includes the following characteristics:

Heat treatment prior to the welding with a view to coarsening γ' phase in the base metal made from nickel-based superalloy (cf. EP 1 428 897 A1). This heat treatment, also known as overageing, increases the ductility and therefore the weldability of the base metal.

Welding without preheating (at room temperature) using conventional manual welding processes, such as TIG or plasma powder welding, or alternatively welding using automated processes, such as laser powder welding or automated plasma powder welding, likewise at room temperature.

Use of closed shielding gas or vacuum boxes, into which the entire component is introduced during welding, in order to protect it from oxidation, is not required. There is also no need for through-flow boxes, in which the component is protected during welding by a correspondingly large flow of shielding gas.

For base metals which are extremely prone to hot cracking and/or oxidation during welding, it is recommended to using shielding gas which contains nitrogen to suppress the hot cracking and/or hydrogen to reduce the oxidation (the shielding gas disclosed in EP 04011321.9 and the composition of the shielding gas form part of the present disclosure).

Heat treatment after welding to homogenize base metal and weld filler: solution annealing. The solution annealing temperature should be adapted to the base metal. The solution annealing temperature must be higher than the solution annealing temperature but lower than the solidus temperature of the weld filler (approx. 1315° C. for SC 52). The single-stage or multi-stage age hardening to set the desired γ' morphology (size, shape, distribution) can take place immediately afterwards or at a later stage during the processing of the hot-gas components.

The weld filler is divided into a base alloy SC 52 and variants of this alloy SC 52+.

SC 52

This weld filler has relatively good welding properties at room temperature. To achieve this, the levels of Al and Ti in the alloy were selected in such a way as to achieve a very low susceptibility to strain-age cracking. The Al content was selected to be less than 4% and the Cr content was selected to be 17-20%, so that the alloy forms a corrosion-resistant $Cr_2O_3$ covering layer and contains a sufficient reservoir for regeneration of this layer under operating conditions.

SC 52+

The changes described below can be implemented by comparison with SC 52.

Titanium: The titanium content is preferably reduced to at most 1.5 wt %, thereby eliminating the risk of the embrittling, incoherent η phase $Ni_3Ti$ being formed. The η phase is formed in the event of high titanium to aluminum contents, for example in the Ni-based superalloy IN939 containing approx. 3.7 wt % Ti and approx. 1.9 wt % Al).

Tantalum: It is preferable to add up to 2.5 wt % tantalum to the alloy, in order to compensate for the loss of γ'-forming titanium.

(Titanium+tantalum): The level of (Ti+Ta) is preferably limited to ≦3.5 wt %, in order to suppress the risk of strain-age cracking. The minimum content is in particular 3 wt %.

Iron: Iron is preferably limited to at most 0.35 wt %, in order to improve the resistance of the alloy to oxidation and to reduce the risk of embrittling TCP phases (TCP=topologically closed packed) being formed.

Silicon: Silicon is preferably limited to at most 0.1 wt %, in order to minimize hot cracking.

Zirconium: Zirconium is preferably added in an amount of 0.01 to 0.1 wt %. It bonds with sulfur and carbon and thereby, in the proportions added, reduces hot cracking.

Lanthanum: Lanthanum is preferably added in an amount of 0.05 wt % to 0.1 wt %, since, like zirconium, it bonds with sulfur and reduces hot cracking.

Sulfur: Sulfur is preferably limited to at most 0.0075 wt %, in order to suppress hot cracking.

Hafnium: Hafnium is preferably added to the alloy in an amount of 0.25 wt % to 0.5 wt %. It bonds with sulfur, reduces the hot cracking and is incorporated in γ', thereby increasing the strength of the latter.

These changes minimize the risk of embrittling TCP phases (topologically closed packed) being formed, and in particular the formation of the η phase $Ni_3Ti$. At the same time, the level of harmful impurities, such as Fe, Mn, S, Si and P, is limited, since these components have a detrimental effect on the weldability and the properties of the alloy of the component.

When producing the component and during welding, oxides and in particular sulfides may form at the grain boundaries. These thin, intercrystalline eutectics containing sulfur and oxygen on the one hand embrittle the grain boundaries. On the other hand, they have a low melting temperature, which leads to a high susceptibility to grain boundary cracking as a result of local fusion of the grain boundaries.

The oxygen embrittlement is counteracted in particular by a local change in the chemical composition of the grain boundaries brought about by the addition of Hf, which segregates at the grain boundary and thereby makes grain boundary diffusion on the part of the oxygen more difficult, thus impeding grain boundary embrittlement, which is caused by oxygen. Moreover, hafnium is incorporated in the γ' phase, increasing its strength.

Zirconium, lanthanum and also hafnium bond with sulfur and thereby allow a significant improvement to be made to the resistance to hot cracking.

The following table summarizes two exemplary embodiments (details in wt %).

| Element | SC 52 | Variant SC 52+ | Effect |
| --- | --- | --- | --- |
| Cr | 17.5–20.0 | 17.5–20.0 | Corrosion resistance, increases the resistance to sulfidation, solid solution hardening |
| Co | 10.0–12.0 | 10.0–12.0 | Reduces the stacking fault energy, resulting in increased creep strength, improves the solution annealing properties |
| Mo | 9.0–10.5 | 9.0–10.5 | Solid solution hardening, increases the modulus of elasticity, reduces the diffusion coefficient |

-continued

| Element | SC 52 | Variant SC 52+ | Effect |
|---|---|---|---|
| Ta | 0 | 0.1 to 2.5 | Substitutes Al in γ', increases the γ' solution temperature, delays γ' coarsening |
| Ti | 3.0–3.3 | 0.1 to 1.5 | Substitute Al in γ', increases the γ' volume proportions |
| Ti + Ta | — | 3 = (Ti + Ta) = 3.5 | |
| Al | 1.4–1.8 | 1.4–1.8 | γ' formation, only effective long-term protection against oxidation at > approx. 950° C., strong solid solution hardening |
| Fe | max 5 | max 0.35 | Promotes the formation of TCP phases, has an adverse effect on resistance to oxidation |
| Mn | max 0.1 | max 0.5 | |
| Si | max 0.5 | max 0.1 | Promotes the formation of TCP phases, increases hot cracking |
| C | 0.04–0.12 | 0.04–0.12 | Carbide formation |
| B | 0.003–0.01 | 0.003–0.01 | Element with grain boundary activity (large atom), increases the grain boundary cohesion, reduces the risk of incipient cracking, increases the ductility and creep rupture strength, prevents the formation of carbide films on grain boundaries, reduces the risk of oxidation |
| ZR | 0 | 0.01–0.1 | Bonds with S and C, increases the resistance to hot cracking |
| Hf | 0 | 0.25–0.5 | Reduces the hot cracking during casting, is incorporated in γ', increasing its strength, improves the resistance to oxidation |
| La | 0 | 0.05–0.1 | Bonds with S, increases the resistance to hot cracking |
| S | max 0.015 | max 0.0075 | |
| P | max 0.03 | max 0.015 | |
| Ni | Remainder | Remainder | |

One application example is the welding of the alloy Rene80, in particular when subject to operational stresses, by means of manual TIG welding and plasma-arc powder surfacing. Further welding processes and repair applications are not ruled out. The weld repair joints have properties which allow "structural" repairs in the airfoil/platform transition radius or in the airfoil of a turbine blade or vane.

Other nickel-based fillers can be selected according to the level of the γ' phase, specifically for preference greater than or equal to 35 vol %, with a preferred maximum upper limit of 75 vol %.

The materials IN738, IN939, PWA1483SX or IN6203DS can preferably be welded using the weld filler according to the invention.

FIG. 2 shows a perspective view of a rotor blade 120 or guide vane 130 of a turbo machine, which extends along a longitudinal axis 121.

The turbo machine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406. As a guide vane 130, the vane 130 may have a further platform (not shown) at its vane tip 415.

A blade or vane root 183, which is used to secure the rotor blades 120, 130 to a shaft or a disk (not shown), is formed in the securing region 400. The blade or vane root 183 is designed, for example, in hammerhead form. Other configurations, such as a fir-tree or dovetail root, are possible. The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy. The blade or vane 120, 130 may in this case be produced by a casting process, also by means of directional solidification, by a forging process, by a milling process or combinations thereof.

Work pieces with a single-crystal structure or structures are used as components for machines which, in operation, are exposed to high mechanical, thermal and/or chemical stresses.

Single-crystal work pieces of this type are produced, for example, by directional solidification from the melt. This involves casting processes in which the liquid metallic alloy solidifies to form the single-crystal structure, i.e. the single-crystal work piece, or solidifies directionally.

In this case, dendritic crystals are oriented along the direction of heat flow and form either a columnar crystalline grain structure (i.e. grains which run over the entire length of the work piece and are referred to here, in accordance with the language customarily used, as directionally solidified) or a single-crystal structure, i.e. the entire work piece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures). Processes of this type are known from U.S. Pat. No. 6,024,792 and EP 0 892 090 A1; these documents form part of the disclosure.

The blades or vanes 120, 130 may likewise have coatings protecting against corrosion or oxidation, for example (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX. Columnar grains are produced in the thermal barrier coating by means of suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired, in which context it is possible to use the weld filler according to the invention. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 3:
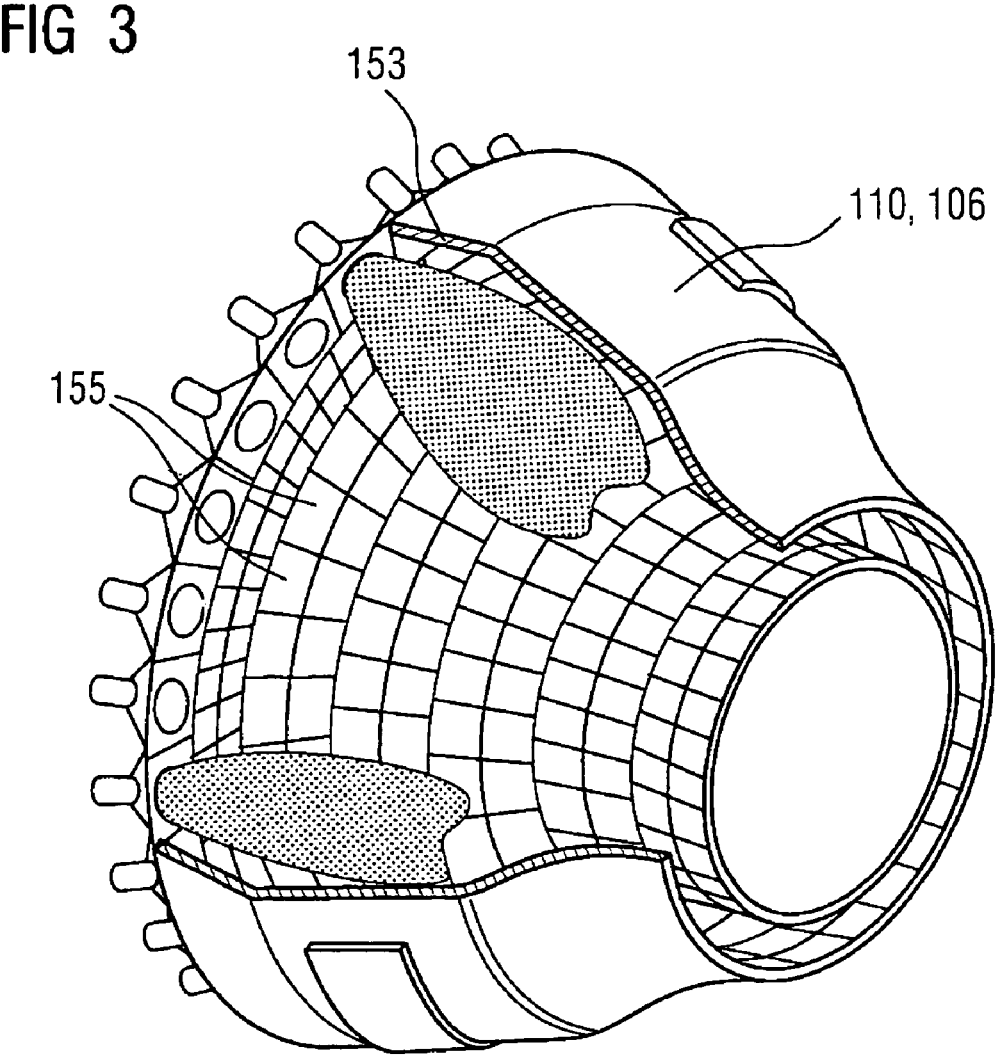
FIG. 3 shows a perspective view of a combustion chamber element.
Figure 4:
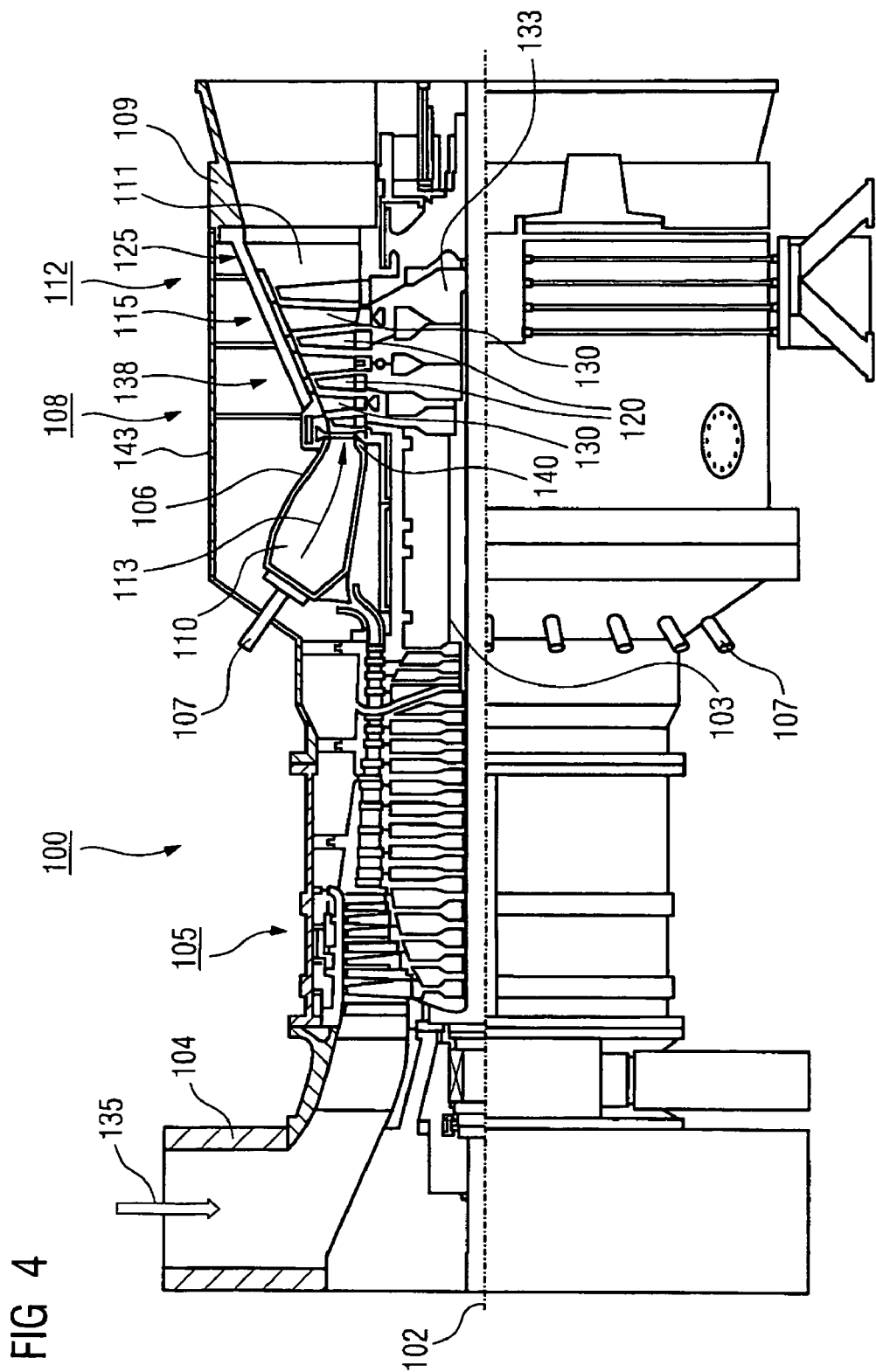
FIG. 4 shows a gas turbine.

FIG. 3 shows a combustion chamber 110 of a gas turbine 100 (FIG. 4). The combustion chamber 110 is configured, for example, as what is known as an annular combustion chamber, in which a multiplicity of burners 107 arranged circumferentially around the axis of rotation 102 open out into a common combustion chamber space 154 and which generate flames 156. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 is equipped with a particularly heat-resistance protective layer (McrAlX layer and/or ceramic coating) or is made from material that is able to withstand high temperatures (solid ceramic bricks). These protective layers may be similar to the turbine blades or vanes, i.e. for example McrAlX: M is at least one element selected from the group consisting of iron (Fe), cobalt (Co), nickel (Ni), X is an active element and represents yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible, for example, for a ceramic thermal barrier coating to be present on the McrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by means of suitable coating processes, such as for example electron beam physical vapor deposition (EB-PVD).

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired using the weld filler according to the invention. This is followed by recoating of the heat shield elements 155, after which the heat shield elements 155 can be reused.

On account of the high temperatures in the interior of the combustion chamber 110, it is also possible for a cooling system to be provided for the heat shield elements 155 and/or for their holding elements. The heat shield elements 155 are in this case for example hollow and may also have film-cooling holes (not shown) opening out into the combustion chamber space 154.

FIG. 4 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103. The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burned in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses. To be able to withstand the temperatures which prevail there, they have to be cooled by means of a coolant.

Substrates of the components may likewise have a directional structure, i.e. they are in single-crystal form (SX structure) or have only longitudinally oriented grains (DS structure). By way of example, iron-based, nickel-based or cobalt-based superalloys are used as material for the components, in particular for the turbine blade or vane 120, 130 and components of the combustion chamber 110. Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

The invention claimed is:

1. A weld filler material, consisting of:
19 wt % chromium;
11 wt % cobalt;
10 wt % molybdenum;
3.0 wt %-3.3 wt % titanium;
1.6 wt % aluminum;
0.09 wt % carbon;
0.005 wt % boron;
0.1 wt % to 2.5 wt % tantalum;
at most 0.35 wt % iron;
at most 0.05 wt % manganese;

at most 0.5 wt % silicon;
at most 0.0075 wt % sulfur;
at most 0.015 wt % phosphorus;
0.01 wt %-0.1 wt % zirconium;
0.25 wt %-0.5 wt % hafnium;
0.05 wt %-0.1 wt % lanthanum; and
remainder nickel.

2. A method for welding a nickel based component, comprising:
  subjecting the component to an overageing heat treatment; and
  welding the component with a filler material consisting of:
    19 wt % chromium,
    11 wt % cobalt,
    10 wt % molybdenum,
    3.0 wt %-3.3 wt % titanium,
    1.6 wt % aluminum,
    0.09 wt % carbon,
    0.005 wt % boron,
    0.1 wt % to 2.5 wt % tantalum,
    at most 0.35 wt % iron,
    at most 0.05 wt % manganese,
    at most 0.5 wt % silicon,
    at most 0.0075 wt % sulfur,
    at most 0.015 wt % phosphorus,
    0.01 wt %-0.1 wt % zirconium,
    0.25 wt %-0.5 wt % hafnium,
    0.05 wt %-0.1 wt % lanthanum, and
    remainder nickel.

* * * * *